United States Patent
Nag et al.

(10) Patent No.: US 6,484,298 B1
(45) Date of Patent: Nov. 19, 2002

(54) METHOD AND APPARATUS FOR AUTOMATIC TIMING-DRIVEN IMPLEMENTATION OF A CIRCUIT DESIGN

(75) Inventors: Sudip K. Nag, San Jose, CA (US); Kamal Chaudhary, San Jose, CA (US); Jason H. Anderson, Campbell, CA (US); Madabhushi V. R. Chari, Milpitas, CA (US); Sandor S. Kalman, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/574,641

(22) Filed: May 18, 2000

(51) Int. Cl.[7] .............................................. G06F 17/50
(52) U.S. Cl. ................... 716/6; 716/10; 716/13
(58) Field of Search ....................... 716/1–12, 13–18; 703/19

(56) References Cited

U.S. PATENT DOCUMENTS

| | | | | |
|---|---|---|---|---|
| 5,422,317 A | * | 6/1995 | Hua et al. ................... 438/129 |
| 5,778,216 A | * | 7/1998 | Venkatesh ................... 713/500 |
| 5,901,063 A | * | 5/1999 | Chang et al. ................... 703/5 |
| 5,953,236 A | * | 9/1999 | Hossain et al. ................ 716/11 |
| 6,192,508 B1 | * | 2/2001 | Malik et al. ................... 716/10 |
| 6,216,252 B1 | * | 4/2001 | Dangelo et al. ................ 716/1 |
| 6,230,304 B1 | * | 5/2001 | Groeneveld et al. ........... 716/7 |
| 6,233,724 B1 | * | 5/2001 | LaBerge ....................... 716/18 |
| 6,286,128 B1 | * | 9/2001 | Pileggi et al. ................. 716/10 |

* cited by examiner

*Primary Examiner*—Matthew Smith
*Assistant Examiner*—Paul Dinh
(74) *Attorney, Agent, or Firm*—LeRoy D. Maunu

(57) ABSTRACT

A method and apparatus for automatic, timing-driven implementation of a circuit design. In one embodiment, the different phases of implementing a circuit design are iteratively performed using timing constraints that are automatically and dynamically generated in each iteration. The process aids in identifying and achieving a maximum performance level of the implemented design. In another embodiment, selected numbers of critical connections are used to dynamically vary the timing constraint. In general, a number of connections is automatically selected from the circuit design and used to derive a new timing constraint to be applied in the next iteration. Slack values associated with paths in the design are also used in deriving the new timing constraint.

20 Claims, 3 Drawing Sheets

METHOD AND APPARATUS FOR AUTOMATIC TIMING-DRIVEN IMPLEMENTATION OF A CIRCUIT DESIGN

FIELD OF THE INVENTION

The present invention generally relates to computer-assisted design of electronic circuits, and more particularly to automating timing-driven optimizations in various phases of implementing a circuit design.

BACKGROUND

The place and route phases of implementing a circuit design generally involve generating a layout of the circuit elements on a chip and defining the signal lines that connect the elements. To satisfy various physical design requirements, the circuit layout is typically optimized based on physical resources. For example, optimization of the layout can be based on resources such as area and wire length. That is, it is desirable for the circuit to occupy the smallest area possible and the smallest possible total wire length.

Performance requirements for a circuit are also considered during the place and route phases. The required performance of a circuit is typically specified by a user and is expressed as the required frequency. This requirement translates to a maximum allowable delay for paths between boundary elements, for example, flip-flops. The maximum path delay that is acceptable is a timing constraint parameter that is provided to the place and route processes.

When place-and-route is performed without regard for timing constraints, a valid placed and routed design can be generated relatively quickly. However, since timing constraints are not considered, the result may not satisfy the performance requirements. When timing constraints are introduced to the place-and-route processes, the placer and router perform delay-driven optimization, which requires a much longer runtime.

In conjunction with the long runtimes associated with delay-driven optimization, the process of maximizing the performance of a circuit may be an iterative process. That is, a designer may choose an initial timing constraint, run the placer and router, and if the design was successfully placed and routed, repeat the process using a tighter timing constraint. However, the next iteration of the process using the new timing constraint may not be feasible, thereby wasting a considerable amount of time in rerunning the placer and router. Alternatively, placing and routing under the new timing constraint may leave room for even further improvement in the performance, thereby requiring another iteration of the process with a further tightened timing constraint. It can be seen that creating a placed and routed design with optimal performance can be a time-consuming process.

A method and apparatus that address the aforementioned and related problems in the place-and-route phases of implementing a circuit design, as well as in other phases of implementation, are therefore desirable.

SUMMARY OF THE INVENTION

In various embodiments, a method and apparatus are provided for automatic, timing-driven optimization in various phases of implementing a circuit design. The timing constraint that is applied during different phases of implementation is dynamically varied in order to improve circuit performance. The processes and apparatus allow automation of the task of determining a circuit's maximum performance. In general, the process begins by determining the timing performance of a given layout. The process then automatically determines a new, tighter timing constraint. In one embodiment, a selected portion of the connections becomes critical in choosing the new, tighter timing constraint. The new timing constraint is then applied in producing a new layout. Slack values associated with paths in the placed/routed design are used in deriving the new timing constraint from the selected number of critical connections.

It is observed that the level of difficulty associated with a timing constrained place-and-route is proportional to the number of connections in a design that are critical. Making a connection "critical" refers to setting a new timing constraint such that the delay of at least one path passing through the connection is greater than the time associated with the timing constraint. To automatically adjust the timing constraint, a selected number of the connections are deemed to be critical. That is, a new timing constraint is chosen such that signal paths through the desired number of connections will become critical in the next iteration of placing or routing the design. By gradually and automatically tightening the timing constraint as a function of a number of critical connections, in the place-and-route phase as well as in other phases of the implementation, a designer's time as well as computation time can be saved.

Various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the present invention are described in terms of adaptations that can be made to conventional tools for implementing a circuit design. Timing constraints are automatically generated instead of requiring the designer to analyze the circuit, estimate an achievable timing constraint, and run the implementation tool. A difficulty with the manual approach is that if the estimated timing constraint is too lenient, maximum performance may not be achieved. On the other hand, if the estimated timing constraint is too aggressive, much time will be spent trying to find a solution, which may not be achievable.

Implementing a circuit design includes numerous phases of processing. In some phases of the implementation process, timing constraints are imposed to optimize performance of the circuit. For example, timing constraints are introduced for synthesis, place-and-route, buffer insertion, gate re-sizing, and wire re-sizing. To simplify explanation of the present invention, the placement and routing phases of implementation are used as examples where the automatic, timing-driven techniques of the present invention could be applied. It will be appreciated that the invention is not limited to placement and routing and is applicable to numerous phases of the implementation process.

Figure 1:
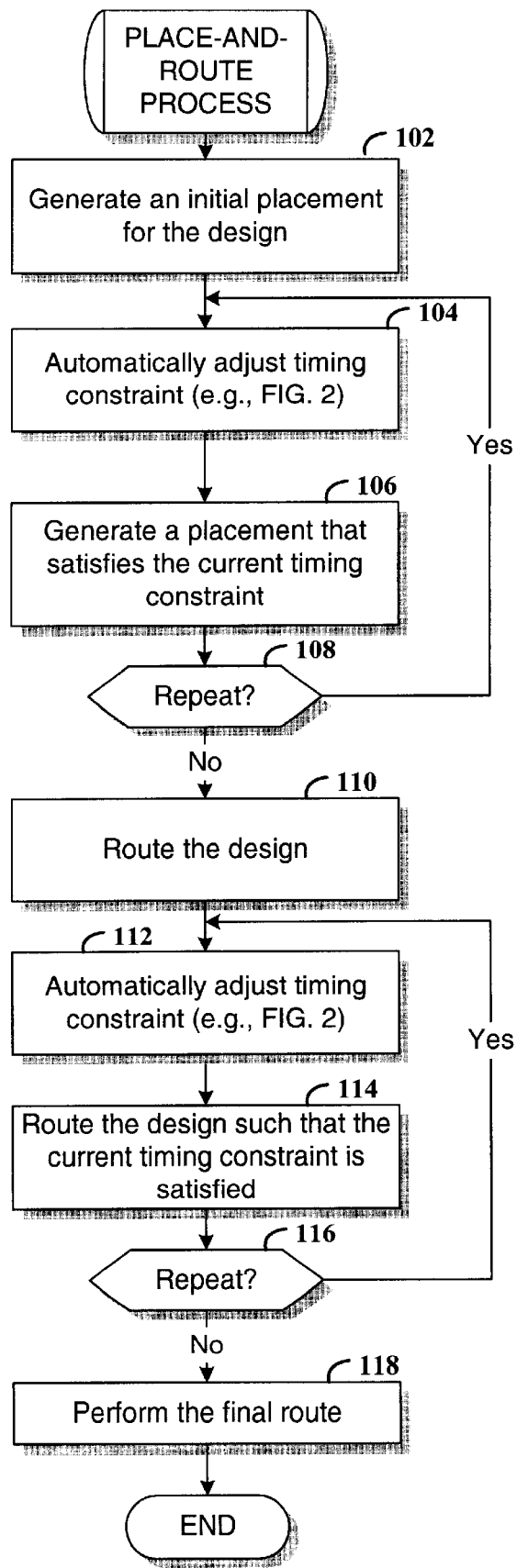
FIG. 1 is a flowchart of a process for placing and routing a design in accordance with various embodiments of the invention.

FIG. 1 is a flowchart of a process for placing and routing a design in accordance with various embodiments of the invention. The process generally entails iteratively placing the design using an increasingly tightened timing constraint that is automatically generated as a function of a selected number of connections to be made critical. The process for routing the design is similar, but with different criteria for selecting the number of connections to be made critical.

The method by which the timing constraint is updated is rooted in the observation that the level of difficulty associated with a timing constrained place-and-route is proportional to the number of connections in a design that are critical. A "connection" refers to a source-sink connection in the design, and a particular design may have hundreds or thousands of connections. To automatically adjust the timing constraint, some of the connections are chosen to become "critical." That is, at least one signal path through the critical connections will become a critical path in the next iteration of placing the design. A path is defined to be a collection of contiguous connections, for example, the set of connections beginning at an input pin and ending at an output pin. A path is called critical if its delay exceeds the requested delay set by the timing constraint. It will be appreciated that the number of paths passing through a particular connection may range from a single path to thousands of paths. Additional details on the process of generating a new timing constraint are set forth in the discussion that accompanies FIGS. 2 and 3. In view of the foregoing, the timing constraint is adjusted as a function of a selected number of connections that are to be made critical.

At step 102, an initial placement is generated for a design. In one embodiment, the initial placement is generated using resource-based optimizations. For example, a resource-based mode of placement involves placing the design while minimizing the area and wire length. In one embodiment, no timing constraints are used to generate the initial placement.

A timing constraint for use in generating the next placement is automatically generated at step 104. In one embodiment, the new timing constraint is generated based upon a selected number of connections that are to be made critical. The particular timing constraint is the delay measured in nanoseconds, for example. It will be appreciated that a frequency measure could be used in another embodiment. In other embodiments, the timing constraint could be automatically adjusted by directly tightening the current timing constraint. The selected amounts of variation in the timing constraint may be based on the stage of layout processing (e.g., placement or routing). The amount of tightening may further be dependent on the state of the layout. For example, a greater tightening of the timing constraint may be selected if much improvement is observed in recent generations of layouts.

At step 106, a new placement is generated based on the new timing constraint. Decision step 108 determines whether the timing constraint should be adjusted again and another placement generated. For example, the placement phase is stopped when it is observed and/or detected that little or no further improvement in timing, wirelength, and/or area has been attained.

If another placement is to be generated, the process returns to step 104 to automatically generate a new timing constraint, and then to step 106 to generate another new placement. Once a satisfactory placement is achieved, processing is directed to step 110 to begin the routing process.

At step 10, the placed design is routed. In one embodiment, the design is routed using resource-based optimizations. Steps 112 and 114 in the routing process are comparable to the corresponding placement process steps.

Figure 2:
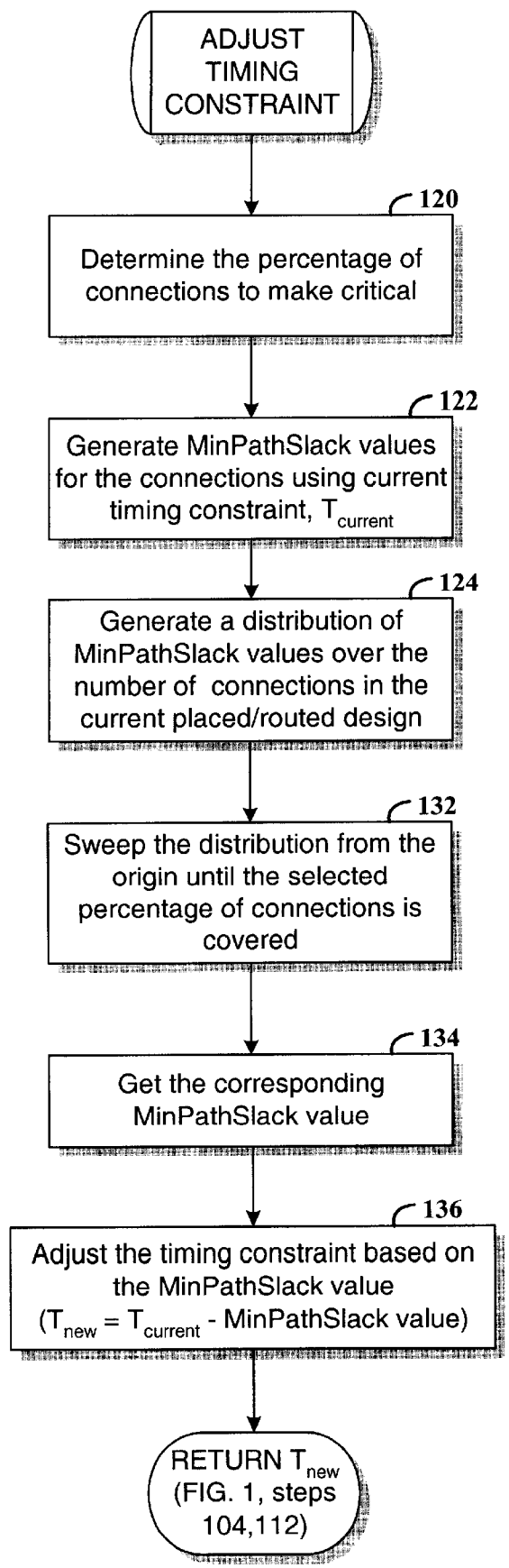
FIG. 2 is a flowchart of a process for adjusting a timing constraint as a function of a selected number of critical connections.
Figure 3:
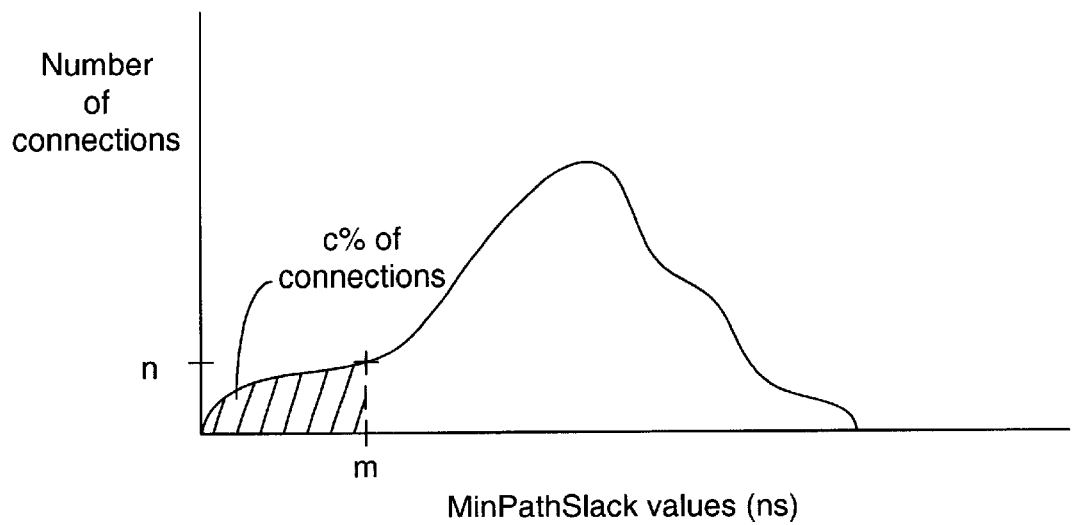
FIG. 3 is a graph that shows the distribution of MinPath-Slack values in nanoseconds over the number of connections for a given current timing constraint.

At step 112, the timing constraint is automatically adjusted. In one embodiment, the timing constraint is generated based upon a selected number of connections that are to be made critical. It has been recognized that there is more flexibility in adjusting timing constraints in the placement phase relative to adjusting timing constraints in the routing phase. Therefore, during the placement phase, a larger percentage of connections are made critical in adjusting the timing constraint than during the routing phase. FIGS. 2 and 3 describe one embodiment of the process of generating a new timing constraint in further detail. In other embodiments, the timing constraint may be automatically adjusted as previously described in association with step 104.

At step 114, the design is routed using the timing constraint. Decision step 116 determines whether the new routed design is acceptable. For example, one method is to completely route the design using the timing constraint and then check whether the constraint is satisfied. Another method is to partially route the design, and using information from the partially routed solution, predict whether it will be possible to meet the timing constraint. If it is desirable to make further improvements in the routed design, the process returns to step 112 to automatically generate a new timing constraint, and then to step 114 to route the design with the new timing constraint.

If the current routed design is acceptable, decision step 116 directs control to step 118. At step 118, the final routed design is generated. Routing may not have been performed at step 114 for some connections or the routing may have been left in an infeasible state. These situations are dealt with by the final routing in step 118. FIG. 2 is a flowchart of a process for adjusting a timing constraint as a function of a selected number of critical connections. The processes uses slack values associated with paths in the placed or routed design and a selected number of critical connections to derive a new timing constraint. The slack value of a path is the difference between the maximum delay allowed for a path and the actual delay value associated with the path. It is generally recognized that estimates of connection delays are used to determine path delays when placing a design. Actual connection delays are typically used when routing a design.

At step 120, a percentage of the number of connections to make critical is determined. With each iteration of an implementation phase (e.g., placement or routing), a new analysis is performed. That is, a new calculation of the delays is performed for the critical paths. A certain percentage of the connections are made critical, based on the analysis. The initial percentage is 15 in placement, for example, and each iteration reduces the percentage by 2%. In other embodiments, with each iteration the percentage may be increased, remain the same, or an arbitrary percentage may be chosen. For routing, the initial percentage is 3, for example. The timing constraint is tightened by a small amount in each subsequent iteration as long as the routing meets the constraint. In another embodiment, the timing constraint can be determined in the routing phase based on a quick, infeasible, but realistic, routing solution. The specific percentages of connections deemed to be critical may vary from one design to another and from one place-and-route tool to another. Therefore, it may be desirable to make configurable the function by which the timing constraint is varied from iteration to iteration.

The slack values for the paths are used in generating MinPathSlack values for the all the connections in the placed/routed design. The MinPathSlack value for a particular connection is the minimum of the slack values associated with all the paths that pass through the connection. For example, if the current timing constraint is 25 ns, paths P1, P2, and P3 pass through connection C1 and have slack values 21 ns, 22 ns, and 23 ns, respectively, then the MinPathSlack value for C1 is 2 ns (25 ns–23 ns =2 ns), With each adjustment of the timing constraint, the current timing constraint, Tcurrent, is used to determine the MinPathSlack values. It will be appreciated that for the initial invocation of the process for adjusting the timing constraint, a suitable initial Tcurrent value must be chosen since there was no Tcurrent value from a prior iteration. The initial value of the timing constraint is what is achieved based on the delays associated with the initial placement solution.

At step 124 a distribution is generated for MinPathSlack values over the number of connections in the placed/routed design. FIG. 3 illustrates an example distribution. Each point on the curve indicates the number of connections having the corresponding MinPathSlack value. For example, n connections have the MinPathSlack value m ns.

The next steps entail determining the MinPathSlack value that corresponds to the selected percentage of connections which are deemed critical. The distribution of MinPathSlack values is swept at step 132 from the lowest MinPathSlack value until the number of connections covered by the selected percentage is accumulated (e.g., the area under the curve from 0 to m is the number of connections for a selected percentage). In one embodiment, the distribution could be represented using a 2-dimensional array in which one vector contains the ordered MinPathSlack values, and the other vector contains the corresponding numbers of connections. The connections vector can be scanned beginning with the lowest MinPathSlack value, accumulating the numbers of connections, and continuing until the selected percentage is reached. The MinPathSlack value encountered when the selected percentage of connections is accumulated is the MinPathSlack value obtained at step 134.

At step 136, the new timing constraint, Tnew, is generated as a function of the current timing constraint, Tcurrent and the MinPathSlack value, for example, the value m as identified at step 134. In one embodiment, Tnew=Tcurrent–m. The new timing constraint is returned to the place-and-route process to be used as the current timing constraint in the ensuing place/route iteration. It will be appreciated that Tnew need not always be less than Tcurrent. The value for m could relax the timing constraint.

FIG. 3 is a graph that shows the distribution of MinPathSlack values in nanoseconds over the number of connections for the current timing constraint. For each iteration of the placement or routing processing, the graph changes in response to the new timing constraint, the new placed or routed design, and new MinPathSlack values. A new distribution is used with each iteration to determine the MinPathSlack value corresponding to a selected percentage of connections deemed critical, which is used to determine the new timing constraint.

The present invention is believed to be applicable to a variety of systems for placing and routing circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for implementing a circuit design, beginning with an initial current implementation, comprising:
   (a) selecting an initial timing constraint as a current timing constraint;
   (b) selecting a number of connections from the circuit design to be deemed critical connections;
   (c) adjusting the current timing constraint as a function of the number of critical connections and slack values of paths that pass through the connections;
   (d) generating a new implementation using the current timing constraint;
   (e) substituting the new implementation for the current implementation; and
   (f) repeating steps (b)–(e) until predetermined criteria are satisfied.

2. The method of claim 1, further comprising:
   generating a distribution of MinPathSlack values over all the connections in the circuit design, wherein a MinPathSlack value for a connection is the minimum of the slack values of paths that pass through the connection; and
   adjusting the current timing constraint as a function of the distribution of MinPathSlack values.

3. The method of claim 2, further comprising selecting a percentage value used in selecting the number of critical connections.

4. The method of claim 3, further comprising adjusting the percentage value each time the number of critical connections is selected.

5. A computer-implemented method for placing a circuit design beginning with a current placement, comprising:
   (a) selecting an initial timing constraint as a current timing constraint;
   (b) selecting a number of connections from the circuit design to be deemed critical connections;
   (c) adjusting the current timing constraint as a function of the number of critical connections and slack values of paths that pass through the connections;
   (d) generating a new placement using the current timing constraint;
   (e) substituting the new placement for the current placement; and
   (f) repeating steps (b)–(e) until predetermined criteria are satisfied.

6. The method of claim 5, further comprising generating an initial placement without timing constraint and beginning with the initial placement as the current placement.

7. The method of claim 5, further comprising:
   generating a distribution of MinPathSlack values over all the connections in the circuit design, wherein a MinPathSlack value for a connection is the minimum of the slack values of paths that pass through the connection; and
   adjusting the current timing constraint as a function of the distribution of MinPathSlack values.

8. The method of claim 7, further comprising selecting a percentage value used in selecting the number of critical connections.

9. The method of claim 8, further comprising adjusting the percentage value each time the number of critical connections is selected.

10. The method of claim 9, further comprising selecting a percentage value used in selecting the number of critical connections.

11. A computer-implemented method for routing a circuit design beginning with a current routed design; comprising:
- (a) selecting an initial timing constraint as a current timing constraint;
- (b) selecting a number of connections from the circuit design to be deemed critical connections;
- (c) adjusting the current timing constraint as a function of the number of critical connections and slack values of paths that pass through the connections;
- (d) generating a new routed design using the current timing constraint;
- (e) substituting the new routed design for the current routed design; and
- (f) repeating steps (b)–(e) until predetermined criteria are satisfied.

12. The method of claim 11, further comprising generating an initial routed design without a timing constraint and beginning with the routed design as the current routed design.

13. The method of claim 11, further comprising:
generating a distribution of MinPathSlack values over all the connections in the circuit design, wherein a MinPathSlack value for a connection is the minimum of the slack values of paths that pass through the connection; and
adjusting the current timing constraint as a function of the distribution of MinPathSlack values.

14. The method of claim 13, further comprising selecting a percentage value used in selecting the number of critical connections.

15. The method of claim 14, further comprising adjusting the percentage value each time-the number of critical connections is selected.

16. The method of claim 11, further comprising selecting a percentage value used in selecting the number of critical connections.

17. A computer-implemented method for placing and routing a circuit design beginning with a current placement, comprising:
- (a) selecting an initial timing constraint as a current timing constraint;
- (b) selecting a number of connections from the circuit design to be deemed critical connections;
- (c) adjusting the current timing constraint as a function of the number of critical connections and slack values of paths;
- (d) generating a new placement using the current timing constraint;
- (e) substituting the new placement for the current placement;
- (f) repeating steps (b)–(e) until predetermined criteria are satisfied;
- (g) routing the current placement, whereby a current routed design is generated;
- (h) selecting an initial timing constraint as a current timing constraint;
- (i) selecting a number of connections from the circuit design to be deemed critical connections;
- (j) adjusting the current timing constraint as a function of the number of critical connections and slack values of paths;
- (k) generating a new routed design using the current timing constraint;
- (l) substituting the new routed design for the current routed design; and
- (m) repeating steps (i)–(l) until predetermined criteria are satisfied.

18. An apparatus for implementing a circuit design beginning with a current implementation, comprising:
- means for selecting an initial timing constraint as a current timing constraint;
- means for selecting a number of connections from the circuit design to be deemed critical connections;
- means for adjusting the current timing constraint as a function of the number of critical connections and slack, values of paths that pass through the connections;
- means for generating a new implementation using the current timing constraint;
- means for substituting the new implementation for the current implementation; and
- means for repeating automatic adjustment of the current timing constraint and generation of a new implementation until predetermined criteria are satisfied.

19. An apparatus for placing a circuit design beginning with a current placement, comprising:
- means for selecting an initial timing constraint as a current timing constraint;
- means for selecting a number of connections from the circuit design to be deemed critical connections;
- means for adjusting the current timing constraint as a function of the number of critical connections and slack values of paths that pass through the connections;
- means for generating a new placement using the current timing constraint;
- means for substituting the new placement for the current placement; and
- means for repeating automatic adjustment of the current timing constraint and generation of a new placement until predetermined criteria are satisfied.

20. An apparatus for routing a circuit design beginning with a current routed design, comprising:
- means for selecting an initial timing constraint as a current timing constraint;
- means for selecting a number of connections from the circuit design to be deemed critical connections;
- means for adjusting the current timing constraint as a function of the number of critical connections and slack values of paths that pass through the connections;
- means for generating a new routed design using the current timing constraint;
- means for substituting the new routed design for the current routed design; and
- means for repeating automatic adjustment of the current timing constraint and generation of a new routed design until predetermined criteria are satisfied.

* * * * *